US012002222B2

(12) United States Patent
Oh et al.

(10) Patent No.: US 12,002,222 B2
(45) Date of Patent: Jun. 4, 2024

(54) DEVICE FOR CALCULATING FLIGHT INFORMATION OF BALL, METHOD OF CALCULATING FLIGHT INFORMATION OF BALL, AND COMPUTING-DEVICE-READABLE RECORDING MEDIUM HAVING THE METHOD RECORDED THEREIN

(71) Applicant: GOLFZON CO., LTD., Daejeon (KR)

(72) Inventors: Sea Jung Oh, Daejeon (KR); Min Ho Lee, Seoul (KR); Tae Hee Lee, Seoul (KR); Seung Hyun Lee, Uiwang-si (KR)

(73) Assignee: GOLFZON CO., LTD., Daejeon (KR)

(*) Notice: Subject to any disclaimer, the term of this patent is extended or adjusted under 35 U.S.C. 154(b) by 103 days.

(21) Appl. No.: 17/721,307

(22) Filed: Apr. 14, 2022

(65) Prior Publication Data

US 2022/0233939 A1    Jul. 28, 2022

Related U.S. Application Data

(60) Continuation of application No. 16/932,833, filed on Jul. 20, 2020, now abandoned, which is a division of
(Continued)

(30) Foreign Application Priority Data

Aug. 12, 2016 (KR) .................. 10-2016-0103047

(51) Int. Cl.
*G06T 7/246* (2017.01)
*A63B 24/00* (2006.01)
(Continued)

(52) U.S. Cl.
CPC .............. *G06T 7/246* (2017.01); *A63B 24/00* (2013.01); *A63B 24/0021* (2013.01);
(Continued)

(58) Field of Classification Search
CPC .. G06T 7/246; G06T 7/33; G06T 7/70; G06T 7/73; A63B 24/00; A63B 24/0021;
(Continued)

(56) References Cited

U.S. PATENT DOCUMENTS 3,620,537 A * 11/1971 Conklin ............. A63B 69/3658
346/8
5,333,874 A     8/1994 Arnold et al.
(Continued)

FOREIGN PATENT DOCUMENTS

JP   2012-020131 A   2/2012
JP   2014-500078 A   1/2014
(Continued)

OTHER PUBLICATIONS

International Search Report for PCT/KR2017/007980 mailed Nov. 24, 2017 from Korean Intellectual Property Office.

*Primary Examiner* — Michael D Dennis
(74) *Attorney, Agent, or Firm* — Revolution IP, PLLC (57) ABSTRACT

Disclosed are a device for calculating flight information of a ball and a method of calculating flight information of a ball that are capable of rapidly calculating the motion parameters of a ball and a golf club using an infrared sensing type device or a camera sensing type device and very rapidly calculating spin information of the ball corresponding to the calculated motion parameters with high accuracy through a simple calculation with reference to database type information about the calculated motion parameters, and a computing-device-readable recording medium having the method recorded therein.

9 Claims, 4 Drawing Sheets

Related U.S. Application Data application No. 16/322,505, filed as application No. PCT/KR2017/007980 on Jul. 25, 2017, now abandoned.

(51) Int. Cl.
| | |
|---|---|
| *A63B 69/36* | (2006.01) |
| *G06T 7/33* | (2017.01) |
| *G06T 7/70* | (2017.01) |
| *G06T 7/73* | (2017.01) |
| *G06V 10/10* | (2022.01) |

(52) U.S. Cl.
CPC ............ *A63B 69/3658* (2013.01); *G06T 7/33* (2017.01); *G06T 7/70* (2017.01); *G06T 7/73* (2017.01); *G06V 10/10* (2022.01); *A63B 2024/0031* (2013.01); *A63B 2220/806* (2013.01)

(58) Field of Classification Search
CPC ........ A63B 69/3658; A63B 2024/0031; A63B 2220/806; G06V 10/10
See application file for complete search history.

(56) References Cited

U.S. PATENT DOCUMENTS

| | | | | |
|---|---|---|---|---|
| 5,354,063 | A * | 10/1994 | Curchod | A63B 69/3623 |
| | | | | 473/155 |
| 5,398,936 | A * | 3/1995 | Kluttz | A63B 69/3658 |
| | | | | 434/252 |
| 5,481,355 | A * | 1/1996 | Iijima | A63B 69/3658 |
| | | | | 356/28 |
| 5,700,204 | A | 12/1997 | Teder | |
| 6,042,483 | A * | 3/2000 | Katayama | A63B 24/0003 |
| | | | | 473/199 |
| 6,086,487 | A * | 7/2000 | Morgan | A63B 71/06 |
| | | | | 473/409 |
| 6,226,416 | B1 * | 5/2001 | Ohshima | G06T 7/246 |
| | | | | 356/28 |
| 6,341,622 | B1 | 1/2002 | McHugh | |
| 9,387,361 | B2 * | 7/2016 | Nomura | G09B 19/0038 |
| 9,566,493 | B2 * | 2/2017 | Kim | A63B 69/3629 |
| 9,604,142 | B2 | 3/2017 | Bentley et al. | |
| 9,645,235 | B2 * | 5/2017 | Tuxen | G01S 13/58 |
| 2002/0107078 | A1 | 8/2002 | Collins | |
| 2004/0127303 | A1 * | 7/2004 | Teraoka | A63B 24/0021 |
| | | | | 473/196 |
| 2005/0107179 | A1 * | 5/2005 | Munshi | A63B 69/0091 |
| | | | | 473/146 |
| 2006/0008116 | A1 * | 1/2006 | Kiraly | G06T 7/20 |
| | | | | 382/103 |
| 2006/0030429 | A1 * | 2/2006 | Rankin | A63B 69/3658 |
| | | | | 473/131 |
| 2006/0095148 | A1 * | 5/2006 | Bowman | A63B 71/06 |
| | | | | 700/90 |
| 2007/0049393 | A1 * | 3/2007 | Gobush | A63B 69/3632 |
| | | | | 473/282 |
| 2007/0060410 | A1 * | 3/2007 | Gobush | A63B 69/3658 |
| | | | | 473/140 |
| 2007/0196800 | A1 * | 8/2007 | Douthit | A63B 69/3667 |
| | | | | 434/252 |
| 2007/0213139 | A1 * | 9/2007 | Stivers | A63B 71/06 |
| | | | | 473/199 |
| 2008/0020867 | A1 * | 1/2008 | Manwaring | A63B 69/362 |
| | | | | 473/407 |
| 2008/0153634 | A1 * | 6/2008 | Welch | A63B 69/0015 |
| | | | | 473/498 |
| 2008/0220891 | A1 * | 9/2008 | Gobush | A63B 69/3658 |
| | | | | 473/221 |
| 2010/0048313 | A1 * | 2/2010 | Mooney | A63B 24/0021 |
| | | | | 473/409 |
| 2010/0049468 | A1 | 2/2010 | Papadourakis | |
| 2010/0210377 | A1 | 8/2010 | Lock | |
| 2011/0021293 | A1 | 1/2011 | York et al. | |
| 2011/0224007 | A1 | 9/2011 | Molinari | |
| 2011/0250939 | A1 * | 10/2011 | Hobler | A63F 13/61 |
| | | | | 463/7 |
| 2012/0016599 | A1 | 1/2012 | Ishii | |
| 2012/0033855 | A1 * | 2/2012 | Ryan | G06T 7/20 |
| | | | | 382/103 |
| 2013/0137528 | A1 * | 5/2013 | Ishii | A63B 37/0003 |
| | | | | 473/409 |
| 2013/0288829 | A1 * | 10/2013 | Kimizuka | A63B 69/3623 |
| | | | | 473/409 |
| 2013/0304417 | A1 | 11/2013 | Mooney et al. | |
| 2014/0185867 | A1 * | 7/2014 | Ishikawa | G06V 40/23 |
| | | | | 382/103 |
| 2016/0001158 | A1 * | 1/2016 | Tawwater | A63B 24/0003 |
| | | | | 463/3 |
| 2017/0157482 | A1 * | 6/2017 | DeCarlo | A63B 63/083 |

FOREIGN PATENT DOCUMENTS

| | | |
|---|---|---|
| KR | 10-2002-0070233 A | 9/2002 |
| KR | 10-2010-0102583 A | 9/2010 |
| KR | 10-2013-0047081 A | 5/2013 |

* cited by examiner

DEVICE FOR CALCULATING FLIGHT INFORMATION OF BALL, METHOD OF CALCULATING FLIGHT INFORMATION OF BALL, AND COMPUTING-DEVICE-READABLE RECORDING MEDIUM HAVING THE METHOD RECORDED THEREIN

CROSS REFERENCE TO PRIOR APPLICATION

This application is a continuation application of U.S. patent application Ser. No. 16/932,833 filed on Jul. 20, 2020, which is a divisional application of U.S. patent application Ser. No. 16/322,505 filed on Feb. 1, 2019, which is a National Stage Application of PCT International Patent Application No. PCT/KR2017/007980 filed on Jul. 25, 2017, under 35 U.S.C. § 371, which claims priority to Korean Patent Application No. 10-2016-0103047 filed on Aug. 12, 2016, which are all hereby incorporated by reference in their entirety.

BACKGROUND

The present invention relates to a device for calculating flight information of a ball and a method of calculating flight information of a ball, and more particularly to a device and method for calculating flight information of a moving ball using information obtained by sensing the motion of a golf club and the motion of the ball when a user hits the ball as the result of the user's golf swing using the golf club.

Attempts have been made to accurately sense physical properties of moving balls in sports using balls, especially a moving ball hit by a golfer in golf, and to analyze the hit ball using the sensed value or to realize the hit ball as an image such that the image can be used in a simulation golf field, such as a so-called screen golf.

In particular, since the ball, which flies as the result of being hit, is rotated about an axis in a three-dimensional space at a very high speed, it is very difficult to measure the spin of the ball. In addition, expensive equipment is needed in order to accurately measure the spin of the ball. Typically, the spin of the ball may be measured using a radar sensor.

However, such an expensive sensing device is not suitable as one which is generally used to analyze a ball hit by a user in a so-called screen golf system or a golf driving range, in which the ball hit according to a golf swing of the user is sensed to calculate the trajectory of the ball, and golf simulation is performed to realize virtual golf based thereon. Therefore, there is a strong necessity for technology that is capable of rapidly and accurately calculating the spin of a ball using a relatively inexpensive and low-performance system.

In order to satisfy this necessity, technology for continuously acquiring and analyzing images of a moving ball using a camera device and calculating the spin of the ball using the result of analysis has been actively developed in recent years.

There are various methods of calculating the spin of a moving ball through image analysis. For example, there are used a method of forming a specific marker on a ball, continuously capturing images of a moving ball using an ultra-high speed camera, and analyzing the marker formed on the ball in the captured images in order to calculate the spin of the ball and a method of extracting and analyzing unspecific feature portions that exist on a ball, such as a brand mark printed on the ball, dimples provided on the ball, and cracks formed in the ball, without forming a specific marker on the ball in order to calculate the spin of the ball.

The former spin calculation method has a severe restriction in that, when a user practices golf shots or plays a round of golf using a plurality of golf balls, a specific marker must be formed on every golf ball. In addition, a plurality of images, which are continuously captured using the ultra-high speed camera, must be analyzed, whereby the operation speed for spin calculation is very slow. That is, the operation speed for spin calculation is very slow, even though very expensive complicated equipment is used.

The latter spin calculation method has an advantage in that a specific marker does not need to be formed on every golf ball. Since an arbitrary feature portion on the ball is extracted through image analysis and the motion of the extracted feature portion based on the spin of the ball is analyzed in order to calculate the spin axis of the ball and the spin amount of the ball, however, the operation for spin calculation is very complicated, and the operation speed thereof is also very slow.

SUMMARY

It is an object of the present invention to provide a device for calculating flight information of a ball and a method of calculating flight information of a ball that are capable of rapidly calculating the motion parameters of a ball and a golf club using an infrared sensing type device or a camera sensing type device and very rapidly calculating spin information of the ball corresponding to the calculated motion parameters with high accuracy through a simple calculation with reference to database type information about the calculated motion parameters, and a computing-device-readable recording medium having the method recorded therein.

In accordance with an aspect of the present invention, the above and other objects can be accomplished by the provision of a device for calculating flight information of a moving ball that is hit using a golf club, the device including a sensor for sensing the motion of the golf club and the motion of the ball that is hit using the golf club, a reference DB for storing values necessary to calculate spin information of the ball as premeasured values of components corresponding to various values of motion parameters of the golf club and the ball in the form of a database, and a calculator for calculating the motion parameter of the golf club and the motion parameter of the ball based on sensing information received from the sensor and calculating spin information of the ball corresponding to the calculated motion parameters through information stored in the reference DB in the form of the database.

In accordance with another aspect of the present invention, there is provided a device for calculating flight information of a moving ball hit using a golf club, the device including a sensor for sensing the motion of the golf club and the motion of the ball hit using the golf club and calculating a motion parameter of the golf club and a motion parameter of the ball based on the sensing information, a reference DB for storing values necessary to calculate spin information of the ball as premeasured values of components corresponding to various values of the motion parameters in the form of a database, and a calculator for receiving the motion parameter of the golf club and the motion parameter of the ball calculated by the sensor and calculating spin information of the ball corresponding to the calculated motion parameters through database type information stored in the reference DB.

In accordance with another aspect of the present invention, there is provided a calculation method performed by a device for calculating flight information of a moving ball that is hit using a golf club, the calculation method including a sensor sensing the motion of the golf club and the motion of the ball that is hit using the golf club and transmitting the sensed motion to a calculator, the calculator calculating a motion parameter of the golf club and a motion parameter of the ball based on sensing information received from the sensor, and the calculator calculating spin information of the ball corresponding to the calculated motion parameters using a reference DB for storing values necessary to calculate spin information of the ball as premeasured values of components corresponding to various values of the motion parameters in the form of a database.

In accordance with a further aspect of the present invention, there is provided a computing-device-readable recording medium having the calculation method recorded therein.

A device for calculating flight information of a ball, a method of calculating flight information of a ball, and a computing-device-readable recording medium having the method recorded therein according to the present invention have effects in that, when a ball moves as the result of being hit using a golf club, it is possible to very rapidly calculate motion parameters, such as the launch angle of the ball, the angle of attack of the golf club, the speed of the ball, and the speed of the golf club, and to very rapidly calculate spin information of the ball corresponding to the calculated motion parameters with high accuracy through a simple calculation with reference to database type information about the calculated motion parameters, stored in a reference DB.

DETAILED DESCRIPTION

A device for calculating flight information of a ball and a method of calculating flight information of a ball according to the present invention will be described in detail with reference to the accompanying drawings.

A device for calculating flight information of a ball according to the present invention, which is a device that calculates flight information of a ball that flies as the result of being hit using sensing information of the motion of the ball and a golf club when a user hits the ball using the golf club, may be applied to a virtual golf simulation apparatus, such as a so-called screen golf system, or may be used as a device for analyzing the ball that is hit as the result of the user's golf swing.

Figure 1:
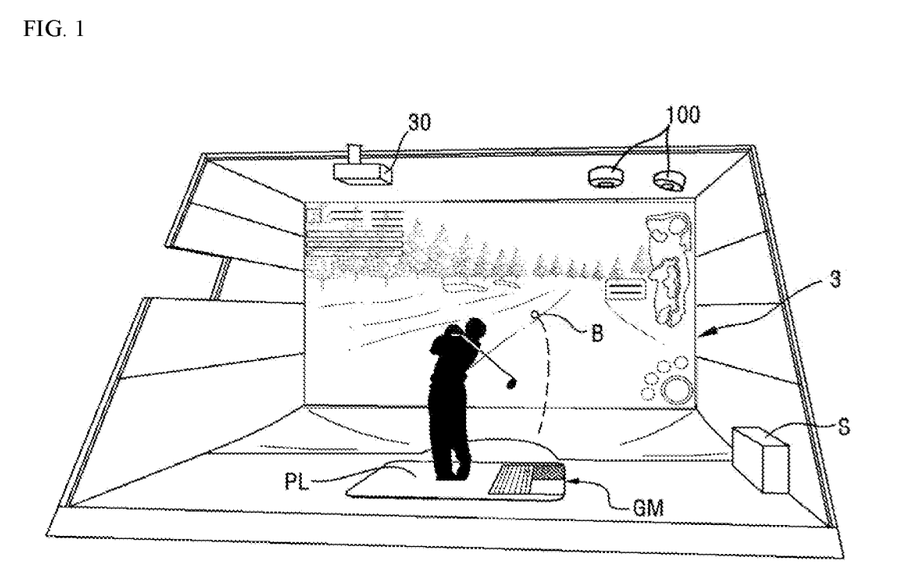
FIG. 1 is a view showing the case in which a device for calculating flight information of a ball according to an embodiment of the present invention is applied to a virtual golf simulation apparatus.
Figure 2:
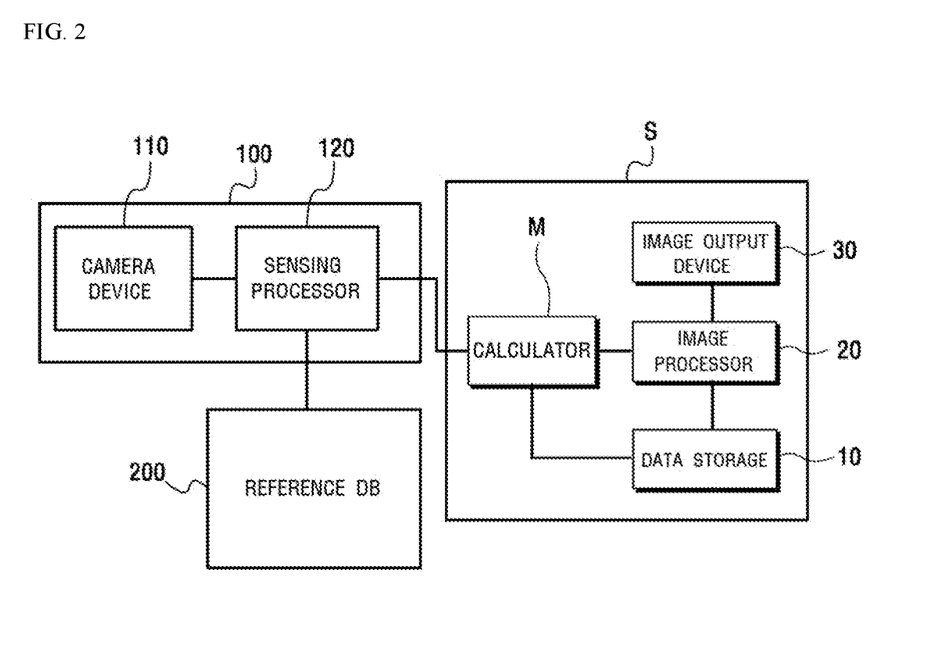
FIG. 2 is a block diagram showing the construction of the device for calculating the flight information of the ball according to the embodiment of the present invention applied to the virtual golf simulation apparatus shown in FIG. 1.

FIGS. 1 and 2 show the case in which a device for calculating flight information of a ball according to an embodiment of the present invention is applied to a virtual golf simulation apparatus.

That is, when a user in a hitting area PL hits a ball B on a golf mat GM toward a front screen 3 as the result of the user's golf swing using a golf club, a sensor 100 senses the motion of the golf club and the motion of the ball and transmits the results of sensing to a calculator M of a simulator S, the calculator M calculates spin information of the ball, such as the speed, direction, and trajectory of the ball, based on sensing information received from the sensor 100, and an image processor 20 realizes an image simulating the motion of the ball in an image projected on the screen 3 using image data stored in a data storage 10 based on the calculated information such that the simulation image is projected on the screen 3 through an image output device 30.

As described above, the device for calculating the flight information of the ball according to the present invention may basically include a sensor 100, a reference DB 200, and a calculator M. The calculation device according to the present invention may be configured to calculate spin information of a ball that is hit and flies as the flight information.

The sensor 100 is an element that senses the motion of a golf club and the motion of a ball when a user hits the ball as the result of the user's golf swing using the golf club, the reference DB 200 is an element that stores, in the form of a database, values necessary to calculate spin information of a ball, which are premeasured values of components corresponding to various values of the motion parameters of a golf club and a ball, and the calculator M is an element that calculates spin information of a ball corresponding to motion parameters of a golf club and to the motion parameters of a ball through information stored in the reference DB 200 in the form of a database using the motion parameters of the golf club and the motion parameters of the ball.

Here, the motion parameters of the golf club may include an angle of attack, a club direction, and a club speed, and the motion parameters of the ball may include a launch angle, a ball direction, and a ball speed. The reference DB 200 may be configured to store premeasured values of components for calculating the spin of a ball with respect to various values of the motion parameters in the form of a database and to store premeasured values of the spin of a ball corresponding to the various values of the components in the form of a database.

The calculator M may calculate some components for calculating spin information of a ball that moves as the result of being hit using a golf club using those of the information stored in the reference DB 200 in the form of a database that correspond to the motion parameters, and may calculate some other components for calculating the spin information of the ball that moves as the result of being hit using components obtained by calculating the motion parameters according to a predetermined functional relationship.

That is, the sensor 100 may sense the motion of a golf club and the motion of a ball, the reference DB 200 may store information of measured values of components for calculating the spin of the ball corresponding to various values of the motion parameters in the form of a database and may store premeasured spin values corresponding to various values of the components for calculating the spin of the ball in the form of a database, and the calculator M may calculate values of the components for calculating the spin of the ball corresponding to the calculated motion parameters with reference to the reference DB 200 and may calculate values of the spin of the ball corresponding to the calculated values of the components for calculating the spin of the ball with reference to the reference DB 200.

This will be described below in more detail.

Meanwhile, the construction of the sensor 100 is not particularly restricted, as long as the sensor 100 includes a sensor that is capable of sensing a moving object. For example, the sensor may be realized by a sensor for sensing variation in the position of a golf club when the golf club is moved and sensing variation in the position of a ball when the ball is hit and moves, such as an infrared sensor or a laser sensor.

Technology that is capable of sensing a moving object using an infrared sensor or a laser sensor is disclosed in a large number of prior art documents, and therefore a detailed description thereof will be omitted.

In addition, as shown in FIGS. 1 and 2, the sensor 100 may be realized by an image sensing type sensing device using a camera that is capable of continuously acquiring images of the motion of a golf club and the motion of a ball and specifying the ball and the golf club in each of the continuously acquired images to calculate position information of the golf club and the position information of the ball, whereby it is possible to sense the motion of the golf club and the motion of the ball.

As shown in FIGS. 1 and 2, the sensor 100 may include a camera device 110 and a sensing processor 120.

The camera device 110 may be configured to continuously acquire images of a ball that is hit using a golf club during a time period including the impact time at which the ball is hit, and the sensing processor 120 may be configured to analyze the images acquired by the camera device 110, to calculate position information of the ball and position information of a head of the golf club in each of the images, and to transmit the calculated position information to the calculator M.

For example, when the sensing processor 120 analyzes images that are continuously acquired by the camera device 110 to specify the ball and the golf club in each of the images and to calculate position information of the ball and position information of the golf club in each of the images and transmits the calculated position information to the calculator M, the calculator M may calculate various motion parameters, such as the launch angle of the ball, the speed of the ball, the speed of the golf club, and the angle of attack of the head of the golf club, using the position information of the ball and the position information of the golf club, and may calculate flight information of the ball, such as spin information of the ball, using the reference DB, a description of which will follow, based on the calculated motion parameters.

Alternatively, the sensing processor 120 may analyze each of the images to calculate position information of the ball and position information of the golf club, may calculate various motion parameters, such as the launch angle of the ball, the speed of the ball, the speed of the golf club, and the angle of attack of the head of the golf club, using the calculated position information, and may transmit the calculated motion parameters to the calculator M, and the calculator M may calculate flight information of the ball, such as spin information of the ball, using the reference DB, a description of which will follow, based on the motion parameters received from the sensing processor 120.

As described above, it is necessary for the device for calculating the flight information of the ball according to the present invention to calculate motion parameters of a golf club and motion parameters of a ball using sensing information of the motion of the golf club and the motion of the ball sensed by the sensor. Preferably, the flight information of the ball is spin information of the ball, which is hit and moves.

Hereinafter, motion parameters of a golf club and motion parameters of a ball necessary to calculate spin information of the ball will be described with reference to FIG. 3.

Figure 3:
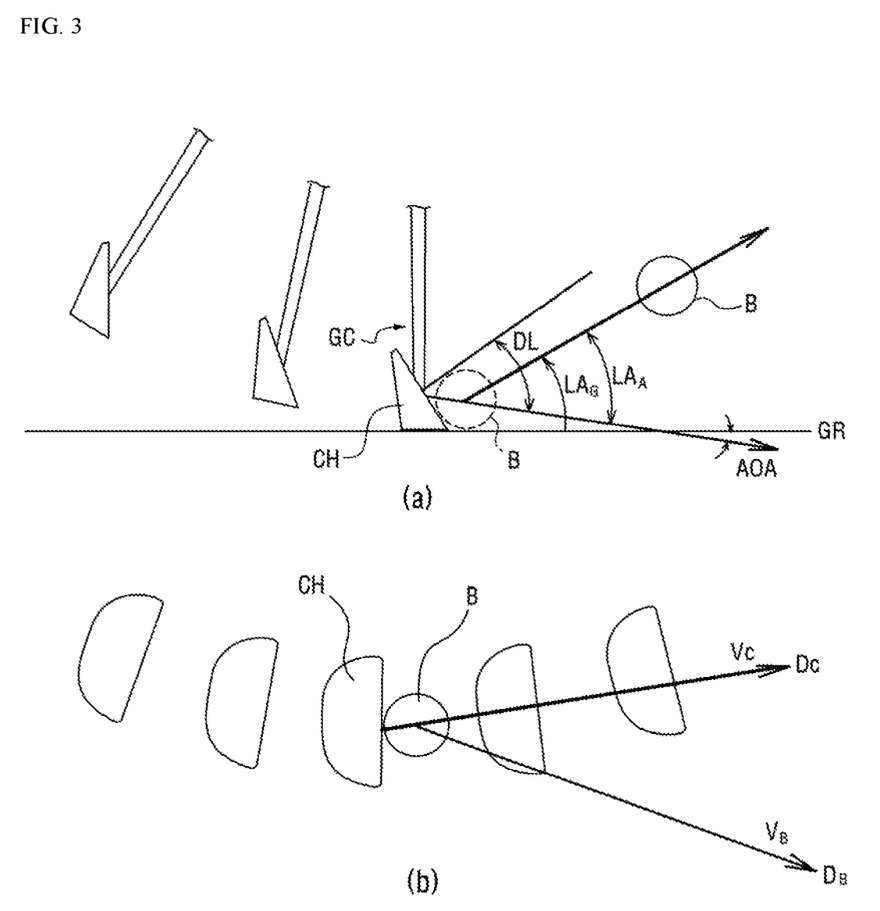
FIG. 3 is a view illustrating motion parameters of a golf club and motion parameters of a ball necessary for the device for calculating the flight information of the ball according to the embodiment of the present invention to calculate spin information of the ball.

FIG. 3(*a*) is a view showing that a golf club GC moves to hit a ball B, as viewed from the side, and FIG. 3(*a*) is a view showing that the golf club GC moves to hit the ball B, as viewed from above.

The device for calculating the flight information of the ball according to the embodiment of the present invention may calculate the angle of attack of the head of the golf club, the swing direction (the club direction, that is, the direction in which the head of the golf club is moved), and the speed of the head of the golf club (the club speed) as the motion parameters of the golf club, and may calculate the launch angle of the ball, the direction of the ball (the ball direction), and the speed of the ball (the ball speed) as the motion parameters of the ball.

These will be described with reference to FIG. 3. As shown in FIG. 3(*a*), the angle at which a club head CH contacts the ball B at the time at which the golf club GC moves and the face of the club head CH impacts the ball B is an angle of attack AOA. As shown in FIG. 3(*b*), the direction in which the club head CH moves is the swing direction $D_C$, and the speed of the club head CH at this time is $V_C$.

As shown in FIG. 3(*a*), the angle between the ball launched as the result of the club head CH impacting the ball B and the ground GR is the launch angle $LA_G$. As shown in FIG. 3(*b*), the direction in which the ball B moves is the ball direction $D_B$, and the speed of the ball at this time is $V_B$.

The spin of the ball, which flies as the result of being hit, may be classified as back spin or side spin. Back spin indicates that a ball is rotated about the horizontal axis thereof in the direction opposite the direction in which the ball flies, and side spin indicates that a ball is rotated leftwards or rightwards about the vertical axis thereof.

In general, when a ball is hit and flies, a back spin component or a side spin component alone is not generated, but the back spin component and the side spin component are simultaneously generated.

It is known that the back spin component of a ball is related to dynamic loft.

Here, the dynamic loft is loft of the face of the head of the golf club with respect to the angle of attack of the head of the golf club at the time of impact. In general, loft is the angle between the normal line of the club face and the horizontal plane.

That is, as shown in FIG. 3(*a*), the dynamic loft is the loft of the head of the golf club with respect to the angle of attack AOA at the time of impact, which is denoted by DL.

The dynamic loft is related to the spin of a ball.

The reference DB of the device for calculating the flight information of the ball according to the embodiment of the present invention prestores premeasured dynamic loft DL values corresponding to various values of the motion parameters, such as the angle of attack AOA of the golf club and the launch angle LA of the ball, described above, in the form of a database. When the motion parameter, such as the angle of attack AOA or the launch angle $LA_G$, is calculated by the sensor and the calculator, the value of the dynamic loft corresponding to the calculated motion parameter may be calculated and determined from data stored in the reference DB.

More specifically, as shown in FIG. 3(a), the launch angle $LA_A$ of the ball with respect to the angle of attack AOA is calculated from the launch angle $LA_G$ of the ball with respect to the ground and the angle of attack AOA. The launch angle $LA_A$ of the ball with respect to the angle of attack AOA may be calculated using the following equation.

$$LA_A = LA_G - AOA$$

The motion parameters of the ball and the golf club described above may be rapidly calculated from the position information of the ball and the head of the golf club sensed by the sensor 100, including the camera device 110 and the sensing processor 120.

From the images acquired by the camera device, the ball may be extracted using the form, the shape, the extent of roundness, the dimple pattern, and the feature portions thereof (for example, a logo or a brand mark printed on the ball, cracks formed in the ball, or a marker arbitrarily formed on the ball), the coordinates of the center point of the extracted ball may be extracted to obtain position information of the ball, and the golf club may be line-fitted through image processing, whereby position information of the head may be obtained in consideration of the end of the fitted line as the head.

In the case in which the position information of the ball and the position information of the golf club are obtained from the images, as described above, it is possible to calculate various motion parameters, such as the speed of the ball, the launch angle of the ball, the direction in which the ball moves, the angle of attack of the club head, the speed of the club head, and the direction in which the club head moves, based on variation in the position information of the ball and the position information of the golf club in several frames.

The method of calculating various motion parameters through the above-described image processing is technology that is disclosed in a large number of prior art documents as well as in patent applications filed in the name of the present applicant, and therefore a detailed description thereof will be omitted.

Meanwhile, the reference DB prestores information about dynamic loft DL values corresponding to various values of the launch angle $LA_A$ in the form of a database. Consequently, the value of the dynamic loft DL corresponding to the calculated launch angle $LA_A$ of the ball with respect to the angle of attack AOA may be calculated from the information stored in the reference DB in the form of a database.

The reference DB may prestore premeasured back spin information of the ball corresponding to various dynamic loft values in the form of a database, and the back spin value of the ball corresponding to the dynamic loft value determined as described above may be calculated and determined from data stored in the reference DB.

Here, since the back spin of the ball is related to the speed of the head of the golf club (the club speed), the reference DB may prestore various dynamic loft values corresponding to various values of the club speed and the back spin values of the ball corresponding thereto in the form of a database, and the back spin value of the ball may be calculated from data stored in the reference DB using the previously calculated values of the club speed and the dynamic loft.

The information stored in the reference DB in the form of a database will be described hereinafter with reference to FIG. 4.

The reference DB may store database type information about premeasured values of the dynamic loft DL corresponding to various values of the launch angle $LA_A$ in the form of a lookup table, and when the calculator calculates the launch angle $LA_A$, the value of the dynamic loft DL corresponding to the calculated launch angle $LA_A$ may be retrieved from the lookup table.

In the case in which the calculated launch angle $LA_A$ does not exist in the lookup table, the value of the dynamic loft may be calculated through the interpolation of values adjacent thereto.

The reference DB may store dynamic loft values and back spin values, measured using an additional sensor when a golf shot is taken based on various values of the motion parameters, in the form of a database.

In the case in which a subject who takes a golf shot based on various motion parameters is a person, such as a pro golfer, it is difficult to accurately measure the dynamic loft values and back spin values.

Consequently, several thousands to tens of thousands of golf shots may be taken under various parameter conditions using a golf shot machine, for example, a ball hitting machine of the type disclosed in Korean Registered Patent No. 10-1425033 and No. 10-1456440 in order to acquire accurate data, which may be stored in the reference DB in the form of a database.

Figure 4:
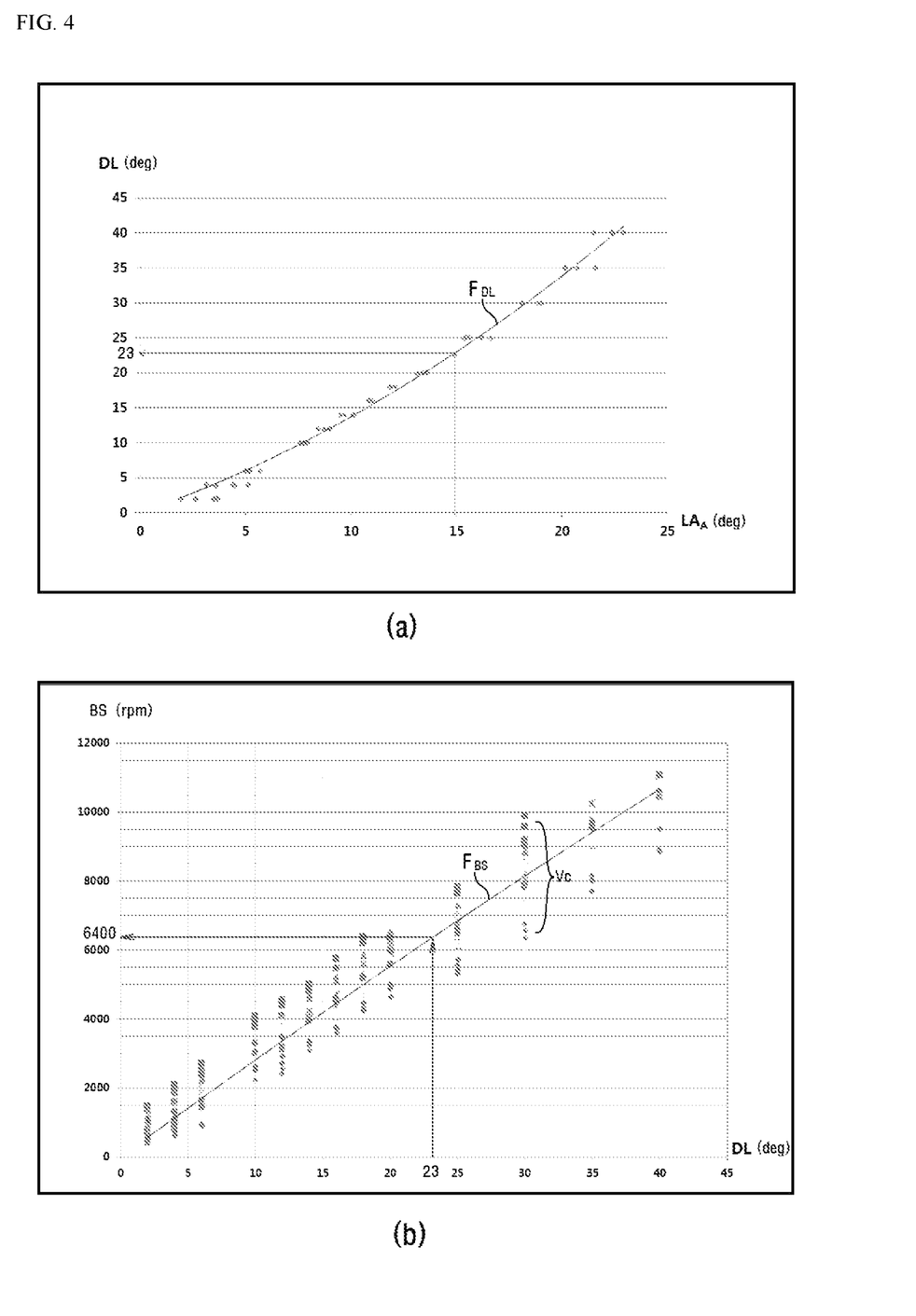
FIG. 4 is a view illustrating that the device for calculating the flight information of the ball according to the embodiment of the present invention calculates the spin information of the ball with reference to a reference DB.

In addition, as shown in FIG. 4(a), the correlation function $F_{DL}$ between the launch angle $LA_A$ and the dynamic loft DL may be statistically derived using values of the launch angle $LA_A$ and the dynamic loft DL stored in the reference DB, and the value of the dynamic loft DL corresponding to the calculated launch angle $LA_A$ may be calculated according to the derived correlation function $F_{DL}$.

FIG. 4(a) shows that data about various kinds of information of the reference DB are distributed along the horizontal axis, which indicates the launch angle $LA_A$, and the vertical axis, which indicates the dynamic loft DL, and shows that the correlation function $F_{DL}$ is derived using a least square method, whereby the value of the dynamic loft DL corresponding to a launch angle $LA_A$ of 15 degrees is calculated to be 23 degrees according to the derived correlation function $F_{DL}$.

Meanwhile, FIG. 4(b) shows values of the back spin BS of the ball corresponding to various values of the dynamic loft DL with respect to various predetermined values of the club speed $V_C$ (FIG. 4(b) shows that different values of the back spin BS are measured for respective club speeds with respect to the same value of the dynamic loft DL).

As shown in FIG. 4(b), the calculator of the present invention may derive a correlation function FBs from data corresponding to the calculated club speed using a statistical analysis method, such as a least square method, and may determine the value of the back spin BS corresponding to the value of the dynamic loft DL, calculated in FIG. 4(a), according to the correlation function FBs. FIG. 4(b) shows that a back spin value of 6400 rpm is calculated with respect to a dynamic loft value of 23 degrees according to the derived correlation function $F_{DL}$.

Meanwhile, the device for calculating the flight information of the ball according to the embodiment of the present invention may determine a ball motion vector based on the ball motion parameters calculated by the sensor or calculated using sensing information of the sensor, such as the launch angle of the ball, the ball direction, and the ball speed, may determine a club motion vector based on the golf club motion parameters, such as the angle of attack, the swing direction, and the speed of the club head, and may calculate information about the spin axis about which the ball spins using the determined ball motion vector and the determined club motion vector.

Figure 5:
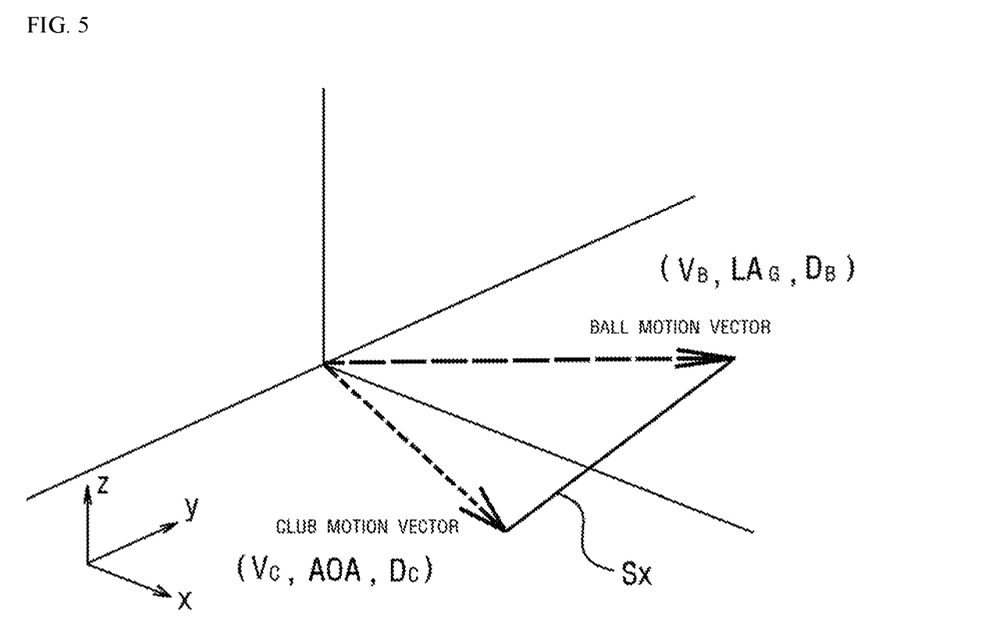
FIG. 5 is a view showing that the device for calculating the flight information of the ball according to the embodiment of the present invention calculates information of a spin axis using a ball motion vector and a club motion vector.

FIG. 5 is a view showing that the spin axis of the ball is calculated using the ball motion vector and the club motion vector. In a three-dimensional space having a coordinate system including an x-axis, a y-axis, and a z-axis, as shown in FIG. 5, the ball motion vector may be obtained using the ball motion parameters, such as the speed of the ball $V_B$, the launch angle of the ball $LA_G$, and the direction of the ball $D_B$, and the club motion vector may be obtained using the club motion parameters, such as the speed of the club head $V_C$, the angle of attack AOA, and the direction of the club head $D_C$.

For the spin axis calculated using the ball motion vector and the club motion vector, as described above, a line interconnecting the end point of the ball motion vector and the end point of the club motion vector may be defined as a spin axis Sx, as shown in FIG. 5.

In addition, the angle between the spin axis Sx, which interconnects the end point of the ball motion vector and the end point of the club motion vector, and the ground is defined as the value of the spin axis Ax, and the side spin value of the ball may be obtained using the value of the spin axis.

That is, the side spin value of the ball may be calculated based on a trigonometric function using the value of the back spin, calculated through the correlation function shown in FIG. 4(b), and the value of the spin axis, calculated as described above.

That is, the side spin value of the ball may be calculated using the following equations.

$$BS=TS*\cos(Ax)$$

$$TS=BS/\cos(Ax)$$

$$SS=TS*\sin(Ax)$$

Here, BS indicates the value of the back spin, TS indicates the total spin value, SS indicates the value of the side spin, and Ax indicates the value of the spin axis.

The device for calculating the flight information of the ball according to the embodiment of the present invention may calculate ball motion parameters and golf club motion parameters through sensing of the sensor, may calculate the value of the dynamic loft corresponding to the calculated motion parameters with reference to the reference DB, and may calculate the value of the back spin using the calculated value of the dynamic loft and the value of the club speed with reference to the reference DB.

In addition, the ball motion vector may be determined using the ball motion parameters, the club motion vector may be determined using the golf club motion parameters, and the value of the spin axis may be calculated using the ball motion vector and the club motion vector according to predetermined conditions.

In the case in which the value of the back spin of the ball and the value of the spin axis are calculated, as described above, the total spin value may be obtained according to the above equations of the trigonometric function, and the value of the side spin may be calculated therefrom.

As is apparent from the above description, the device for calculating the flight information of the ball according to the present invention has an advantage in that the spin of a ball is not calculated in a difficult manner through a huge amount of calculations based on image analysis, but a simple calculation is performed through a lookup table or through a correlation function derived from the distribution of data using the reference DB, which stores various kinds of premeasured information, whereby it is possible to rapidly calculate spin information.

A device for calculating flight information of a ball, a method of calculating flight information of a ball, and a computing-device-readable recording medium having the method recorded therein according to the present invention are applicable to industries related to golf practice, in which the analysis of a ball hit according to a golf swing is performed, and so-called screen golf, in which a user may enjoy a round of virtual golf through golf simulation based on virtual reality.

What is claimed is:

1. A virtual golf simulation apparatus for providing an image simulating a motion of a golf ball hit by a user's golf swing, the apparatus comprising:
   a sensor configured to detect a motion of a golf club and a motion of the golf ball moved by the user's golf shot using the golf club, including:
      a camera configured to consecutively acquire images of the motion of the golf club and the golf ball during a time period including an impact time at which the golf ball is hit by a head of the golf club; and
      a sensing processor configured to analyze the acquired images to obtain positions information of the golf ball and the head of the golf club in each of the images and to obtain motion parameters of the golf club and motion parameters of the golf ball using the positions information of the golf ball and the head of the golf club,
   a reference DB configured to store premeasured data for spins of golf balls moved by golf shots corresponding to golf clubs' motion parameters and golf balls' motion parameters in a form of a database; and
   a simulator comprising a spin processor, a data storage, an image processor, and a display,
      the simulator configured to provide a simulation image which simulates the motion of the golf ball hit by applying the motion parameters of the golf ball obtained by the sensing processor and the spin calculated by the spin processor,
      the spin processor configured to obtain a spin of the moving golf ball detected by the sensor using the reference DB' premeasured data for spins corresponding to the motion parameters of the golf club and the golf ball obtained by the sensing processor,
      the data storage configured to store an image data based on the spin of the moving golf ball obtained by the spin processor,
      the image processor configured to generate the image simulating the motion of the golf ball based on the image data stored in the data storage, and
      the display configured to display a simulation image generated by the image processor,
   wherein the sensing processor is configured to obtain an angle of attack, which is an angle at which the head of the golf club contacts the golf ball at an impact time and a speed of the head of the golf club as the motion parameters of the golf club, and obtain a launch angle of the golf ball as the motion parameters of the golf ball, and
   wherein the reference DB is configured to store database type information about values of the angle of attack premeasured as the golf clubs' motion parameters, about values of a dynamic loft, which is a loft of a face of a head of a golf club at an impact time corresponding to a launch angle according to impact, premeasured as the golf balls' motion parameters, and to store database type information about values of a back spin of a golf ball corresponding to the dynamic loft with respect to predetermined value of a head speed of a golf club, wherein the values of the back spin of the golf ball are premeasured corresponding to values of the dynamic loft, wherein the spin processor is configured to:

determine a value of the dynamic loft corresponding to the obtained angle of attack of the golf club and the obtained launch angle of the golf ball with reference to the reference DB, and determine a value of the back spin corresponding to the determined value of the dynamic loft and the obtained head speed of the golf club with reference to the reference DB, wherein the spin processor is configured to:

determine a ball motion vector based on the obtained launch angle of the golf ball, the obtained direction of the golf ball, and the obtained speed of the golf ball, determine a club motion vector based on the obtained angle of attack, the obtained swing direction, and the obtained head speed of the golf club, and calculate a spin axis about which the golf ball spins using the determined ball motion vector and the determined club motion vector according to predetermined conditions, wherein the spin processor is configured to calculate a value of a side spin of the golf ball using information about the determined value of the back spin of the ball and the calculated spin axis according to a predetermined functional relationship.

2. The apparatus according to claim 1, wherein the sensing processor is configured to specify the golf ball in each of the acquired images, and extract coordinates of a center point of the specified golf ball as the position information of the golf ball in each of the acquired images.

3. The apparatus according to claim 2, wherein the sensing processor is configured to line-fitting for specifying the golf club in each of the acquired images, and extract coordinates of an end point of the fitted line as the position information of the head of the golf club in each of the acquired images.

4. A virtual golf simulation apparatus for providing an image simulating a motion of a golf ball hit by a user's golf swing, the apparatus comprising:

a sensor configured to detect a motion of a golf club and a motion of the golf ball moved by the user's golf shot using the golf club, including:

a camera configured to consecutively acquire images of the motion of the golf club and the golf ball during a time period including an impact time at which the golf ball is hit by a head of the golf club; and a sensing processor configured to analyze the acquired images to obtain positions information of the golf ball and the head of the golf club in each of the images, a reference DB configured to store premeasured data for spins of golf balls moved by golf shots corresponding to golf clubs' motion parameters and golf balls' motion parameters in a form of a database; and a simulator comprising a spin processor, a data storage, an image processor, and a display, the simulator configured to provide a simulation image which simulates the motion of the golf ball hit by applying the motion parameters of the golf ball obtained by the sensing processor and the spin calculated by the spin processor, the spin processor configured to obtain a spin of the moving golf ball detected by the sensor using the reference DB' premeasured data for spins corresponding to the motion parameters of the golf club and the golf ball obtained by the sensing processor, the data storage configured to store an image data based on the spin of the moving golf ball obtained by the spin processor, the image processor configured to generate the image simulating the motion of the golf ball based on the image data stored in the data storage, and the display configured to display a simulation image generated by the image processor.

5. The apparatus according to claim 4, wherein the spin processor is configured to:

obtain an angle of attack of the head of the golf club, a swing direction of the golf club and a speed of the head of the golf club using the positions information of the golf ball and the head of the golf club as the motion parameters of the golf club, and obtain a launch angle of the golf ball, a direction of the golf ball and a speed of the golf ball using the positions information of the golf ball and the head of the golf club as the motion parameters of the golf ball.

6. The apparatus according to claim 5, wherein the reference DB is configured to store database type information about an angle of attack, which is an angle at which a head of a golf club contacts a golf ball at an impact time, premeasured as one of the golf clubs' motion parameters, to store database type information about a dynamic loft, which is a loft of a face of a head of a golf club at an impact time corresponding to a launch angle according to impact, premeasured as one of the golf balls' motion parameters, and to store database type information about values of a back spin of a golf ball corresponding to the dynamic loft with respect to predetermined value of a head speed of a golf club, wherein the values of the back spin of the golf ball are premeasured corresponding to values of the dynamic loft.

7. The apparatus according to claim 6, wherein the spin processor is configured to:

determine a value of the dynamic loft corresponding to the obtained angle of attack of the golf club and the obtained launch angle of the golf ball with reference to the reference DB, and determine a value of the back spin corresponding to the determined value of the dynamic loft and the obtained head speed of the golf club with reference to the reference DB.

8. The apparatus according to claim 7, wherein the spin processor is configured to:

determine a ball motion vector based on the obtained launch angle of the golf ball, the obtained direction of the golf ball, and the obtained speed of the golf ball, determine a club motion vector based on the obtained angle of attack, the obtained swing direction, and the obtained head speed of the golf club, and calculate a spin axis about which the golf ball spins using the determined ball motion vector and the determined club motion vector according to predetermined conditions.

9. The apparatus according to claim 8, wherein the spin processor is configured to calculate a value of a side spin of the golf ball using information about the determined value of the back spin of the ball and the calculated spin axis according to a predetermined functional relationship.

* * * * *